(12) United States Patent
Reiter

(10) Patent No.: US 8,313,084 B2
(45) Date of Patent: Nov. 20, 2012

(54) ELECTROMAGNETICALLY OPERATABLE VALVE

(75) Inventor: Ferdinand Reiter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 1020 days.

(21) Appl. No.: 12/087,023

(22) PCT Filed: Oct. 30, 2006

(86) PCT No.: PCT/EP2006/067907
§ 371 (c)(1),
(2), (4) Date: Dec. 4, 2008

(87) PCT Pub. No.: WO2007/073961

PCT Pub. Date: Jul. 5, 2007

(65) Prior Publication Data
US 2009/0179166 A1 Jul. 16, 2009

(30) Foreign Application Priority Data

Dec. 22, 2005 (DE) .......................... 10 2005 061 409

(51) Int. Cl.
*F16K 31/02* (2006.01)

(52) U.S. Cl. .......... 251/129.14; 251/129.21; 239/585.1; 239/585.4; 123/490

(58) Field of Classification Search ............ 251/129.14, 251/129.21; 137/901, 539.5; 239/585.1, 239/585.2, 585.3, 585.4; 123/490
See application file for complete search history.

(56) References Cited

U.S. PATENT DOCUMENTS

| | | | | |
|---|---|---|---|---|
| 1,311,830 A * | 7/1919 | Mohr | | 251/275 |
| 1,605,824 A * | 11/1926 | Erickson | | 251/75 |
| 4,474,208 A * | 10/1984 | Looney | | 137/516.29 |
| 5,035,261 A * | 7/1991 | Koiwa | | 137/516.11 |
| 5,553,829 A * | 9/1996 | Hemsen | | 251/129.21 |
| 5,626,325 A * | 5/1997 | Buchanan et al. | | 251/129.14 |
| 5,704,553 A * | 1/1998 | Wieczorek et al. | | 239/585.1 |
| 5,820,032 A * | 10/1998 | Reiter | | 239/585.1 |
| 5,984,263 A * | 11/1999 | Hosoya | | 251/129.15 |
| 6,045,116 A * | 4/2000 | Willke et al. | | 251/129.21 |
| 6,302,371 B1 * | 10/2001 | Reiter | | 251/129.21 |
| 6,332,761 B1 * | 12/2001 | Guentert et al. | | 417/490 |
| 6,783,086 B1 * | 8/2004 | Boecking | | 239/585.1 |
| 6,840,499 B2 * | 1/2005 | Ahn | | 251/129.14 |
| 6,929,197 B2 * | 8/2005 | Peterson, Jr. | | 239/533.2 |
| 7,273,186 B2 * | 9/2007 | Kubo et al. | | 239/88 |
| 2001/0010341 A1 * | 8/2001 | Koizumi et al. | | 239/468 |
| 2009/0301442 A1 * | 12/2009 | Reiter | | 123/490 |

FOREIGN PATENT DOCUMENTS

| | | |
|---|---|---|
| DE | 40 08 675 | 9/1991 |
| DE | 195 03 224 | 8/1996 |
| DE | 19537382 | 4/1997 |

(Continued)

*Primary Examiner* — John Rivell
*Assistant Examiner* — Minh Le
(74) *Attorney, Agent, or Firm* — Kenyon & Kenyon LLP

(57) ABSTRACT

An electromagnetically operatable valve, in particular a fuel injector for fuel injection systems of internal combustion engines, includes a magnetic circuit having a core, a solenoid, an armature, which operates a valve closing body cooperating with a fixed valve seat and is drawn against the core when the solenoid is excited, and is held on the valve closing body by a closing body carrier representing a part of a valve needle. The spherical valve closing body is secured on the closing body carrier in a non-positive manner due to the shape of the corresponding connecting surfaces. The valve is suitable in particular for use in fuel injection systems of mixture-compressing, externally ignited internal combustion engines.

11 Claims, 3 Drawing Sheets

FOREIGN PATENT DOCUMENTS

| | | |
|---|---|---|
| DE | 19712590 | 10/1998 |
| EP | 0 321 128 | 6/1989 |
| EP | 0 321 129 | 6/1989 |
| EP | 0321129 | 6/1989 |
| EP | 0773364 | 5/1997 |
| WO | 97/16641 | 5/1997 |

* cited by examiner

ELECTROMAGNETICALLY OPERATABLE VALVE

FIELD OF THE INVENTION

The present invention is directed to an electromagnetically operatable valve.

BACKGROUND INFORMATION

FIG. 1 shows a fuel injector known from the related art, having a conventional three-part design of an internal metallic flow guide part and a housing component. This internal valve tube is formed by an inlet connecting piece forming an internal pole, a non-magnetic intermediate part and a valve seat carrier accommodating a valve seat. An axially movable valve needle situated in the valve seat carrier includes an armature and a spherical valve closing body as well as a connecting tube that connects the armature to the valve closing body. The three individual components of the valve needle are fixedly joined together by an integral joining method, welding in particular.

German patent document DE 40 08 675 A1 discusses such an electromagnetically operatable valve in the form of a fuel injector. The internal valve tube forms the basic skeleton of the entire injector and has an essential supporting function in its entirety for the three individual components. The non-magnetic intermediate part is fixedly and tightly connected to both the inlet connecting piece and to the valve seat carrier by welds. The windings of a solenoid are inserted into a plastic coil carrier, which in turn surrounds in the circumferential direction a part of the inlet connecting piece used as an internal pole and also surrounds the intermediate part. An axially movable valve needle situated in the valve seat carrier includes a sleeve-shaped armature and a spherical valve closing body as well as a connecting tube that connects the armature to the valve closing body. The connecting tube is fixedly attached by welds to both the armature and to the valve closing body.

German patent document DE 195 03 224 A1 discusses another electromagnetically operatable valve in the form of a fuel injector. The fuel injector has a spherical valve closing body cooperating with a valve seat, the valve closing body being mounted on a closing body carrier in the form of a plastic tube, while an armature is attached to the plastic tube at the end opposite the valve closing body. These components together form an axially movable valve needle. The lower end of the plastic tube is designed in the shape of a spherical cap and the valve closing body is positively secured in the convex recess with the aid of a snap-on connection. The plastic tube has a spring-elastic design in the area of the lower recess because holding jaws must enclose the valve closing body. In order to ensure that the spherical valve closing body is firmly secured, the holding jaws enclose the valve closing body over its equator, so that the opening diameter of the recess on the plastic tube below the equator of the valve closing body is smaller than the diameter of the valve closing body.

SUMMARY OF THE INVENTION

The electromagnetically operatable valve according to the present invention having the characterizing features of the main claim has the advantage that a simplified and cost-effective manufacture and automatic assembly of the valve and, in particular, of the valve needle, is implementable because integral joining methods such as welding, which have the disadvantage of thermal distortion, and complex positive joining methods may be omitted. Instead, the valve closing body may be advantageously secured in a reliable manner on the connecting tube or the closing body carrier of the valve needle exclusively with the aid of a non-positive bond via suitable shaping of the mating surfaces and material selection, without an additional arrangement.

The measures recited in the subclaims make advantageous improvements on and refinements of the electromagnetically operatable valve, in particular a fuel injector, described in the main claim possible.

It is advantageous in particular to use a valve closing body made of a ceramic material, whereby the mass of the valve needle may be reduced. To further reduce the mass of the valve needle, the closing body carrier may also be made of plastic. The reduced mass of the valve needle results in the advantages of improved dynamics of the valve and reduced noise generation.

Due to the simple manufacturability of the valve needles and, in particular, of the closing body carriers as metallic MIM parts or made of plastic, different valve needle lengths may be produced in a very simple manner.

It is also advantageous that a filter function may be integrated in the closing body carrier using simple measures.

Exemplary embodiments of the present invention are illustrated in the drawing in a simplified manner and explained in greater detail in the following description.

DETAILED DESCRIPTION

Figure 1:
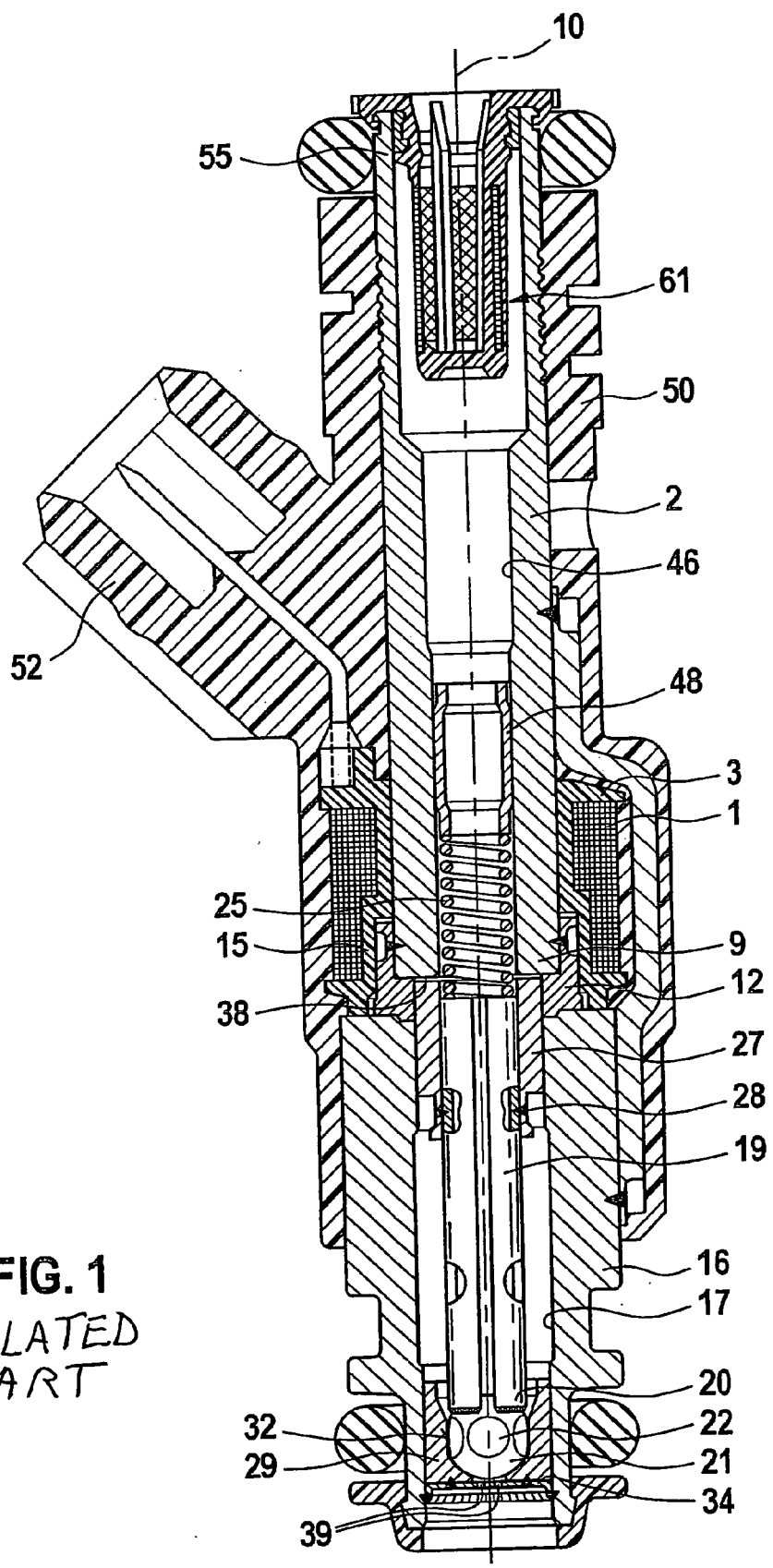
FIG. 1 shows a fuel injector as an example of an electromagnetically operatable valve according to a known design of a valve needle of the related art.

The electromagnetically operatable valve in the form of an injector for fuel injection systems of mixture-compressing, externally ignited internal combustion engines, shown in FIG. 1 as an example, has a core 2, which is designed here in the form of a tube surrounded by a solenoid 1, has a constant external diameter over its entire length, and functions as the internal pole and fuel inlet connecting piece. A bobbin 3 having steps in the radial direction accommodates a winding of solenoid 1 and, in combination with core 2, allows a compact design of the injector in the area of solenoid 1.

A tubular metallic non-magnetic intermediate part 12 is attached tightly, e.g., by welding, to a lower core end 9 of core 2 in such a way that it is concentric with a longitudinal valve axis 10, and thereby partially surrounds core end 9 axially. Stepped bobbin 3 partially surrounds core 2 and, with a step 15 of a larger diameter, axially surrounds intermediate part 12 at least partially. Downstream from bobbin 3 and intermediate part 12, a tubular valve seat carrier 16 extends and is fixedly connected to intermediate part 12. A longitudinal borehole 17, which is designed to be concentric with longitudinal valve axis 10, runs in valve seat carrier 16. At its downstream end 20, a tubular valve needle 19 provided in longitudinal borehole 17 is attached by welding, for example, to a spherical valve closing body 21 on whose circumference five flattened areas 22, for example, are provided to allow the flow of fuel past it.

The injector is operated electromagnetically in a known way. The electromagnetic circuit having solenoid 1, core 2, and an armature 27 functions to provide the axial movement of valve needle 19 and thus to open it against the spring force of a restoring spring 25 and/or to close the injector. Armature 27 is attached to the end of valve needle 19 facing away from valve closing body 21 by a weld 28 and is aligned with core 2. A cylindrical valve seat body 29 having a fixed valve seat is tightly installed by welding in longitudinal borehole 17 at the downstream end of valve seat carrier 16 facing away from core 2.

A guide opening 32 of valve seat body 29 acts to guide valve closing body 21 during the axial movement of valve needle 19 with armature 27 along longitudinal valve axis 10. Spherical valve closing body 21 cooperates with the valve seat of valve seat body 29, which tapers in the form of a truncated cone in the direction of flow. On its end facing away from valve closing body 21, valve seat body 29 is fixedly and concentrically connected to an injection hole disk 34 designed in the shape of a pot, for example. At least one, e.g., four spray opening(s) 39 shaped by erosion or punching, run(s) in the bottom part of injection hole disk 34.

The insertion depth of valve seat body 29 with pot-shaped injection hole disk 34 determines the preliminary setting of the lift of valve needle 19. One end position of valve needle 19 when solenoid 1 is not excited is determined by the contact of valve closing body 21 with the valve seat of valve seat body 29, while the other end position of valve needle 19 when solenoid 1 is excited is determined by the contact of armature 27 with core end 9.

An adjustment sleeve 48 inserted into a flow borehole 46 of core 2 running concentrically with longitudinal valve axis 10, the adjustment sleeve being shaped from rolled spring steel sheet, for example, functions as an adjustment of the spring pretension of restoring spring 25, which rests on adjustment sleeve 48 and is supported at its opposite end on valve needle 19. The injector is largely surrounded by a plastic sheathing 50. This plastic sheathing 50 includes, for example, an integrally molded electric plug connector 52. A fuel filter 61 protrudes into flow borehole 46 of core 2 at its inlet end 55 to filter out fuel constituents which might cause blockage or damage in the injector due to their size.

Figure 2:
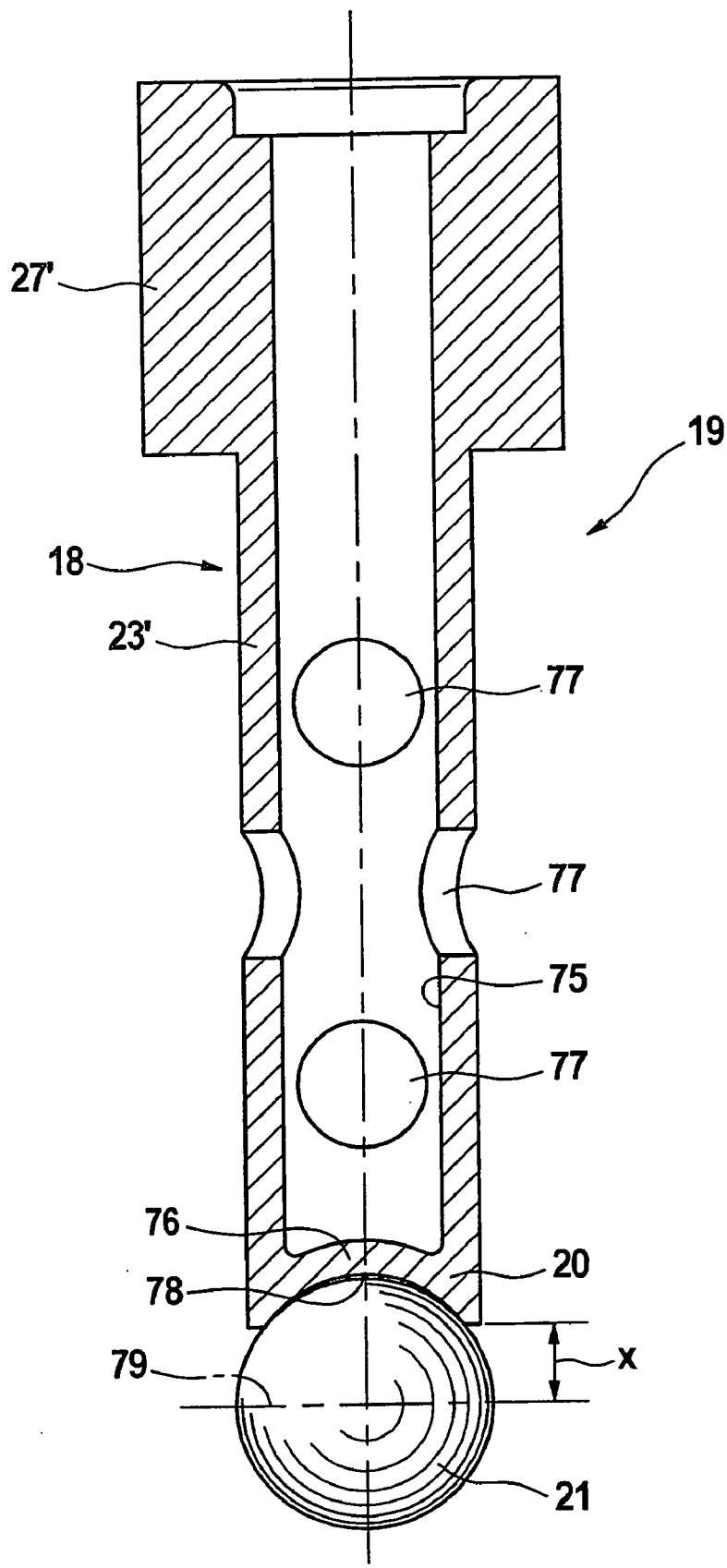
FIG. 2 shows a first exemplary embodiment of a valve needle according to the present invention in an enlarged representation.

FIG. 2 shows a first exemplary embodiment of a valve needle 19 according to the present invention in an enlarged representation. In this embodiment, valve needle 19 has two individual components, which together form the component valve needle 19. A closing body carrier 18 forms a first individual component, while a spherical valve closing body 21 forms the second individual component of valve needle 19. Closing body carrier 18 in turn includes two sections, one armature section 27' having a larger diameter and a sleeve-shaped connecting tube section 23' having a smaller diameter. The single-piece closing body carrier 18 is manufactured by MIM (Metal Injection Molding) processes, for example, and has an internal longitudinal opening 75, which is closed at its downstream end by an oblique bottom 76. A plurality of transverse openings 77, through which fuel flows from the inside to the outside in the direction of the valve seat, runs in the wall of connecting tube section 23' starting from longitudinal opening 75. On its side opposite internal longitudinal opening 75, bottom 76 is provided with a suitable contour for receiving valve closing body 21. A convex, i.e., spherical cap-shaped recess 78 is provided in bottom 76 for this purpose.

Figure 3:
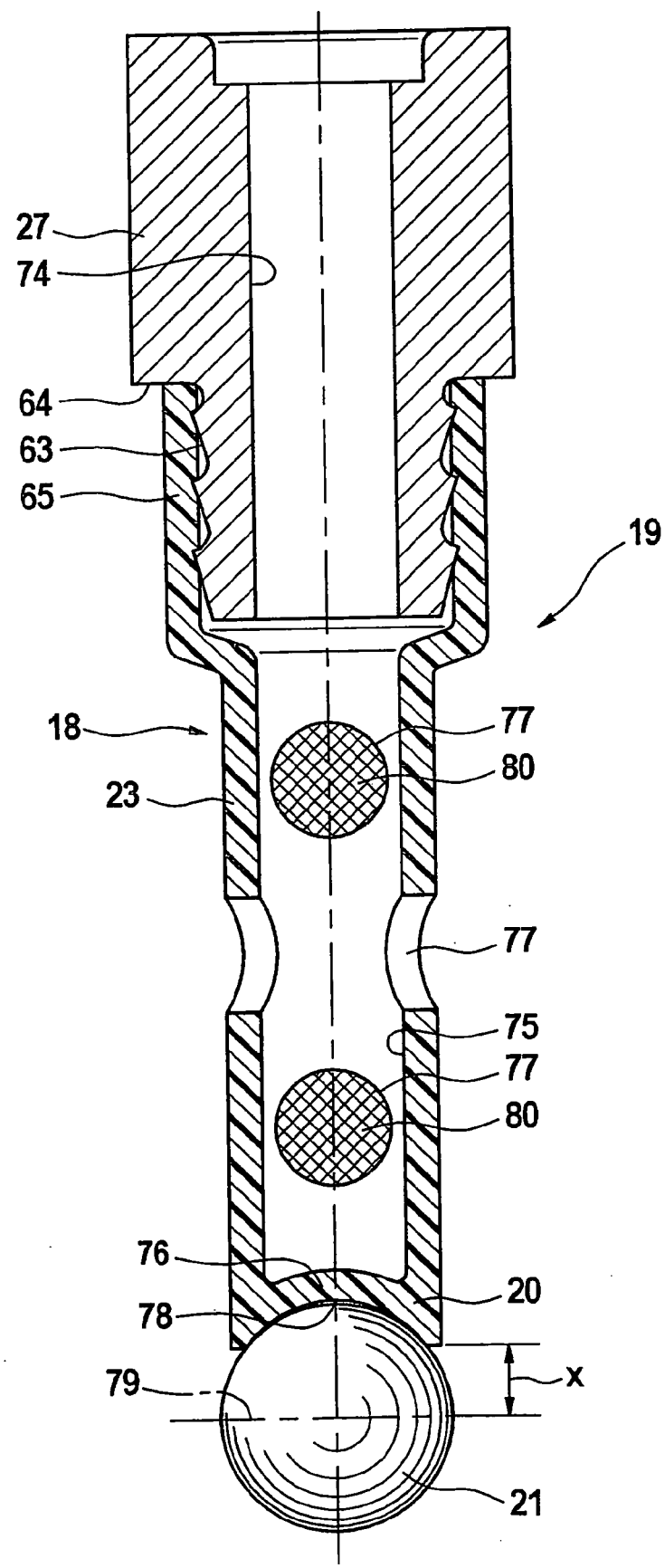
FIG. 3 shows a second exemplary embodiment of a valve needle according to the present invention in an enlarged representation.

The shape of recess 78 may be very precisely produced via a suitable tool design. The convex receptacle surface of recess 78 has a slightly smaller diameter than the diameter of spherical valve closing body 21, which causes a non-positive connection to be obtained between closing body carrier 18 and valve closing body 21, after valve closing body 21 has been mounted, by applying a slight contact force, without need for any additional resource. In particular under the effect of fuel, the quality of the non-positive connection further improves. The adhesion of valve closing body 21 to closing body carrier 18 is sufficiently high in the system according to the present invention to securely, reliably, and reproducibly draw valve closing body 21 from the valve seat of valve seat body 29 via closing body carrier 18 when solenoid 1 is energized, although valve closing body 21 is "loosely" held on closing body carrier 18. Recess 78 on closing body carrier 18 is designed in such a way that it encloses valve closing body 21 only via a spherical section which ends above equator 79 at a distance x therefrom. Distance x is shown exaggeratedly large in FIGS. 2 and 3 compared to a practicable design for the sake of clarity. Valve closing body 21 is designed, for example, as a complete sphere having the highest quality, so that excellent sealing results are achievable. A ceramic material, for example, $Si_3N_4$, may be used as the material for valve closing body 21. Such a material has only approximately ⅓ of the mass of a valve closing body of comparable size made of steel as is normally used. The type of attachment of valve closing body 21 according to the exemplary embodiments and/or exemplary methods of the present invention allows, however, complete freedom in the choice of material for valve closing body 21, which may be metallic, ceramic, or plastic.

FIG. 3 shows a second exemplary embodiment of a valve needle 19 according to the present invention in an enlarged representation. In this embodiment, valve needle 19 has three individual components, which together form the component valve needle 19. Armature 27, which is designed as a turned part, for example, forms a first individual component, while a spherical valve closing body 21 forms the second individual component of valve needle 19. A connecting tube 23 which connects armature 27 to valve closing body 21 represents closing body carrier 18. Connecting tube 23 is manufactured by plastic injection molding, for example, and has an internal longitudinal opening 75, which is closed at its downstream end by an oblique bottom 76. A longitudinal opening 74, whose diameter is approximately equal to the diameter of longitudinal opening 75 in connecting tube 23, is also provided in armature 27.

Armature 27 has a sawtooth-like structure 63 having a "Christmas tree profile" on its lower end facing valve closing body 21. This structure 63 matches an upper widened end 65 of plastic connecting tube 23. Armature 27 with its structure 63 is pressed into connecting tube 23 to produce a fixed connection between armature 27 and connecting tube 23, specifically in such a way that structure 63 is securely and, for example, non-rotatably hooked and spread at end 65 of connecting tube 23. Structure 63 penetrates the plastic of connecting tube 23, and the plastic subsequently relaxes. The press-in depth of armature 27 into connecting tube 23 may be exactly defined by an annular shoulder 64 on armature 27. A plurality of transverse openings 77, through which fuel flows from the inside to the outside in the direction of the valve seat, run in the wall of connecting tube 23 starting from longitudinal opening 75. Transverse openings 77 may optionally be provided with a plastic or metallic mesh 80, which is applied as an insert in the injection molding process of connecting tube 23. On its side opposite internal longitudinal opening 75, bottom 76 is provided with a suitable contour for accommodating valve closing body 21. A convex, i.e., spherical cap-shaped recess 78 is provided in bottom 76 for this purpose.

Also in this embodiment, the shape of recess 78 may be very precisely produced via a suitable tool design. The convex receptacle surface of recess 78 has a slightly smaller diameter than the diameter of spherical valve closing body 21, which causes a non-positive connection to be obtained between closing body carrier 18 and valve closing body 21 after valve closing body 21 has been mounted, by applying a slight contact force. When solenoid 1 is energized, valve closing body 21 is securely, reliably, and reproducibly drawn from the valve seat of valve seat body 29 via closing body carrier 18, although valve closing body 21 is "loosely" held on closing body carrier 18. A ceramic material, for example $Si_3N_4$, is suitable as the material for valve closing body 21 designed as a complete sphere. The type of mounting of valve closing body 21 according to the present invention allows, however, complete freedom in the choice of material for valve closing body 21, which may be metallic, ceramic, or plastic.

The exemplary embodiments and/or exemplary methods of the present invention is not limited to an application in a fuel injector, but may be used in different types of electromagnetically operatable valves in which valve needles having spherical valve closing bodies are used.

What is claimed is:

1. An electromagnetically operable valve, which is a fuel injector for a fuel injection system of an internal combustion engine, comprising:
   a longitudinal valve having an axis;
   a core;
   a solenoid;
   a valve closing body;
   an armature to operate the valve closing body cooperating with a fixed valve seat and which is drawn against the core when the solenoid is excited; and
   a closing body carrier on which the valve closing body is held;
   wherein the valve closing body is secured on the closing body carrier exclusively in a non-positive manner due to a shape of the corresponding connecting surfaces and without an additional arrangement,
   wherein the valve closing body has a spherical shape and is held in one of a convex cap-shaped recess and a spherical cap-shaped recess of the closing body carrier,
   wherein the spherical valve closing body has a slightly greater diameter than a diameter of the recess of the closing body carrier.

2. The valve of claim 1, wherein the valve closing body is made of a ceramic material, which is $Si_3N_4$.

3. The valve of claim 1, wherein the recess on the closing body carrier is configured so that it encloses the valve closing body only via a spherical section which ends above an equator at a distance therefrom.

4. The valve of claim 1, wherein the closing body carrier, as part of a valve needle, represents a single-piece individual component composed of an armature section and a connecting tube section.

5. The valve of claim 4, wherein the closing body carrier is manufactured by a MIM process.

6. The valve of claim 1, wherein the closing body carrier, as part of a valve needle, represents a single-piece individual component in the form of a connecting tube, the connecting tube connecting the armature to the valve closing body.

7. The valve of claim 6, wherein the connecting tube is made of plastic and the armature is made of a metallic material.

8. The valve of claim 7, wherein the armatures includes a sawtooth-like structure, which is pressed into the connecting tube for producing a fixed connection with the connecting tube.

9. The valve of claim 1, wherein there is a mesh in the closing body carrier.

10. The valve of claim 1, wherein the valve closing body is held on the closing body carrier loosely.

11. The valve of claim 1, wherein the valve closing body is secured on the closing body carrier in both the opening and closing processes of the valve.

* * * * *